US006836451B1

United States Patent
Farnsworth et al.

(10) Patent No.: US 6,836,451 B1
(45) Date of Patent: Dec. 28, 2004

(54) LENSLESS OPTICAL SERVO SYSTEM FOR AN OPTICALLY ASSISTED DISK DRIVE

(75) Inventors: Stephen W. Farnsworth, Loveland, CO (US); Werner Spaeth, Munich (DE); Kirk Cook, Lyons, CO (US)

(73) Assignee: Infineon Technologies, AG, Munich (DE)

(*) Notice: Subject to any disclaimer, the term of this patent is extended or adjusted under 35 U.S.C. 154(b) by 685 days.

(21) Appl. No.: 09/591,930

(22) Filed: Jun. 12, 2000

(51) Int. Cl.[7] .............................................. G11B 7/00
(52) U.S. Cl. ............................ 369/44.11; 369/112.17
(58) Field of Search ........................ 369/44.16, 44.11, 369/112.17, 112.19, 112.22, 120, 44.14, 14, 44.41, 44.25, 44.36, 44.33; 250/201.5, 216

(56) References Cited

U.S. PATENT DOCUMENTS

| | | | | |
|---|---|---|---|---|
| 4,633,451 A | * | 12/1986 | Ahn et al. | 369/14 |
| 4,718,052 A | * | 1/1988 | Kondo et al. | 369/44.12 |
| 5,065,387 A | * | 11/1991 | Roth et al. | 369/44.41 |
| 5,701,283 A | * | 12/1997 | Alon et al. | 369/44.41 |
| 5,886,971 A | * | 3/1999 | Feldman et al. | 369/112.05 |
| 5,949,066 A | * | 9/1999 | Rice et al. | 250/231.13 |
| 6,262,414 B1 | * | 7/2001 | Mitsuhashi | 250/216 |
| 6,574,066 B1 | * | 6/2003 | Stubbs et al. | 360/77.03 |

OTHER PUBLICATIONS

Farnsworth et al., Monolithic Optical Pickup and an Assembly Including the Pickup with Laser Source(s) and Optical Detector(s), U.S. application Ser. No. 09/569,096, filed May 10, 2000.

* cited by examiner

*Primary Examiner*—Kimlien Le
(74) *Attorney, Agent, or Firm*—Fish & Richardson P.C.

(57) ABSTRACT

A lensless optical servo system has an unfocused light source and patterned photodetectors. The unfocused light is reflected by markings on a rotating disk and the reflected light carriers the pattern of the markings to the photodetectors. The convolution of this light pattern and a mating geometric pattern on the photodetectors causes the photodetectors to generate signals representing the position of the track on the disk. In one embodiment, a laser diode and three detectors are formed on the same silicon substrate. Sinusoidal metalization is applied to the detectors in the radial direction. The period of the sinusoidal metalization is two times the tracking pitch of the disk. The metalization on the first detector is approximately ninety degrees behind the metalization on the second detector and the metalization on the third detector is approximately ninety degrees ahead of the metalization on the second detector.

20 Claims, 5 Drawing Sheets

LENSLESS OPTICAL SERVO SYSTEM FOR AN OPTICALLY ASSISTED DISK DRIVE

BACKGROUND OF THE INVENTION

1. Field of the Invention

The invention broadly relates to optical servo systems. More particularly, the invention relates to the optical detection system used in an optically assisted disk drive to detect marks on a magnetic disk and thereby precisely locate the magnetic read/write head relative to tracks on the magneto-optical disk.

2. Brief Description of the Prior Art

Since the introduction of the personal computer in the 1970's and the development of the floppy disk, the need for greater and greater amounts of storage space has continued unabated. The original floppy disk could store less than 100 kilobytes and the most commonly used (3.5 inch) floppy disk today, introduced in the late 1980's can store 1.4 megabytes. Although fixed (hard) disks now store many gigabytes, there remains a need for removable storage media with high capacity.

High capacity removable storage media became popular in the 1980's with the advent of desktop publishing (DTP). Relatively large, clumsy, and undependable "cartridges" from Syguest, Iomega, and other companies were used to transport large DTP files that could not fit on a floppy disk, to a printing plant. High capacity storage media is still in demand today for transporting large files when a broadband connection is not available and for transporting confidential information without using the public network.

One high capacity removable media system which is growing in popularity is the "a:drive" from OR Technology Inc. of Campbell, Calif. While its outward appearance is almost indistinguishable from that of a 3.5 inch, 1.44 megabyte floppy disk drive, the "a:drive" provides 120 megabytes of storage on ultra high density disks, known as "LS-120" or "Superdisk" media. At the same time, the "a:drive" product is compatible with current and legacy 3.5 inch technology and can read and write to both 720 kilobyte and 1.44 megabyte disks. As its name implies, the "a:drive" can serve as a bootable drive in any system in which it is installed.

The "a:drive" achieves its high capacity and enhanced accuracy and reliability by using an optical positioning system for accurately guiding a magnetic dual-gap head that accommodates the differing track densities of conventional and ultra high density disks without error or mishap.

Prior art FIG. 1 shows a dual media disk storage system for reading data from and writing data to the surface 10 of removable magnetic media 12 having an axis of rotation 14 and a plurality of concentric data tracks 16. Although the disk drive system is capable of handling dual media, in this instance, for the sake of clarity, only one disk is shown, the well known 3.5 high density type that holds 1.44 megabytes when formatted.

A read/write head 18 is guided by an actuator 20 and actuator arm 22 which positions the read/write head 18 over a desired track 16 on the surface 10 of disk 12. The actuator arm 22 carries a strip having a periodic reflection profile 24 which is used in this instance because the 3.5 disks do not carry any location markings on their surface. In this instance, the periodic reflection profile 24 is a linear encoder. Actuator 20 is under control of a conventional, closed loop servo system 28 which is responsive to a signal from an optical sensor 30 mounted on the underside of sensor housing 28.

FIG. 2 shows in more detail how a split beam arrangement is used to detect either the reflection profile for a linear encoder when reading/writing 3.5 disks or the markings on the surface of an LS-120 disk when reading/writing it. The sensor system carried on the arm 22 includes, in addition to the light detector 30, a laser source 32, a hologram 34, a lens array 36 and a rooftop mirror 38. Light from the laser source 32 is diffracted by the hologram 34 and focused by the lens array 36. The rooftop mirror directs the light and reflections to either the linear encoder 24 or the surface of an LS-120 disk 40.

It can be appreciated from prior art FIG. 2 that the sensor system requires multiple passive optical elements, all of which must be aligned during the assembly process. The alignment requires expensive tooling. Each passive element occupies a finite space and additional space must be provided for the alignment tooling. The sizes of the elements also require a large mechanical supporting structure.

In addition, it will be appreciated by those skilled in servo system shown in prior art FIG. 2 is relatively large and wi a "full height" drive bay to be accommodated.

Additionally those skilled in the art will recognize th servo system for an LS-120 type disk drive requires a quadrature between the adjacent sensors; that the detection of the sensors m synchronous; and that the first stage of the pre-amplifier used in a typical optical servo system would be more effective by amplifying the tangential and radial tracking signals only and not the DC component, thereby allowing for a larger gain and more signal amplitude.

In the prior art, light from a laser is typically focused by passive optical elements to form three highly focused points of light at the plane of the disk. Other passive optical elements gather reflected light from these three points and focus the reflected light onto three separate detectors. The detectors produce track sensing signals that include a low noise pair of sinusoidal signals in exact quadrature indicating the track radial position.

SUMMARY OF THE INVENTION

It is therefore an object of the invention to provide an improved positioning device (referred to hereinafter generically as optical servo systems) that can be used for metrology, optical data storage, or data storage systems that use optical features on the media for tracking purposes.

It is also an object of the invention to provide optical servo systems for data storage devices that do not require alignment of elements during assembly of the data storage devices.

It is another object of the invention to provide an optical servo system for a data storage device that reduces the overall cost of the data storage device.

It is still another object of the invention to provide an optical servo system for a data storage device that is smaller in size than conventional optical pickup systems.

It is also an object of the invention to provide an optical servo system that provides built-in quadrature phase shift.

It is another object of the invention to provide an optical servo system in which the source and detector(s) are fabricated on a single substrate.

It is still another object of the invention to provide an optical servo system in which each of the optical detectors and apertures are small enough and close enough to provide a synchronous detection.

It is also an object of the invention to provide an optical servo system that requires fewer components in the first stage of a signal preamplifier.

It is another object of the invention to provide an optical servo system that operates without lenses.

It is still another object of the invention to provide an optical servo system that has a high signal to noise ratio.

In accord with these objects, which will be discussed in detail below, the present invention provides a lensless optical servo system having an unfocused light source and patterned photodetectors. The unfocused light is reflected by the markings on an LS-120 disk and the reflected light carries the pattern of the markings the considerable distance in its far-field to the photodetectors. The convolution of this light pattern and a mating geometric pattern on the photodetectors causes the photodetectors to generate signals representing the position of the track on the disk.

According to a presently preferred embodiment of the invention, set forth herein to illustrate the principals of the invention, a laser diode and three detectors are formed on the same silicon substrate. Further, according this illustrative preferred embodiment, sinusoidal metalization (a form of aperture) is applied to the detectors in the radial direction (radial relative to the LS-120 disk); the period of the sinusoidal metalization is approximately two times the tracking pitch of the disk; the metalization on the first detector is offset radially approximately ninety degrees behind the metalization on the second detector; and the metalization on the third detector is offset radially approximately ninety degrees ahead of the metalization on the second detector. Alternatively, in lieu of sinusoidal metalization an absorbing sinusoidal feature may be provided.

Preferably, each detector is provided with two sinusoidal patterns, approximately one hundred eighty degrees out of phase with each other with respect to the tangential direction (tangential relative to the LS-120 disk). The patterns are subtracted to remove the DC component (noise) of the tracking signal. This allows for a differential detection system to occur before the tangential modulation of the tracking signal is removed. Thus, the first stage of a preamplifier is more effective by amplifying the tangential and radial tracking signals only and not the DC component, thereby allowing for a larger gain and more signal amplitude.

The silicon substrate is also provided with a source laser diode that is aligned so the reflection from the disk is substantially centered on the second detector. A fold mirror is also provided to direct light from the source laser diode to the disc in a manner well known by those skilled in the art.

The invention features an positioning systems, (such as optical servo systems), which perform optical sensor functions without the need for an imaging optic, utilizing only unfocused laser light and patterned photodetectors.

Advantages of the invention include (1) obviation of separate holographic optical elements required by the prior art (as well as other lens elements) to reduce system cost; (2) a less complex assembly process for the devices contemplated by the invention is achieved by (a) eliminating the need to align and attach any optical elements to the laser detector module, (b) eliminating the need to steer light onto a detector during the assembly process since all reflected light from the media will have all the tracking information required to operate the system, and (c) since the radial shift required to make the tracking signals in quadrature is built into the aperture, there is no alignment requirement for this parameter; and (3) end users experience a lesser degree of complexity and cost in installing the device contemplated by the invention in their products since there is less material physically present at the top of the detector system which nominally requires delicate handling.

Additional objects and advantages of the invention will become apparent to those skilled in the art upon reference to the detailed description taken in conjunction with the provided figures.

DETAILED DESCRIPTION

Figure 1:
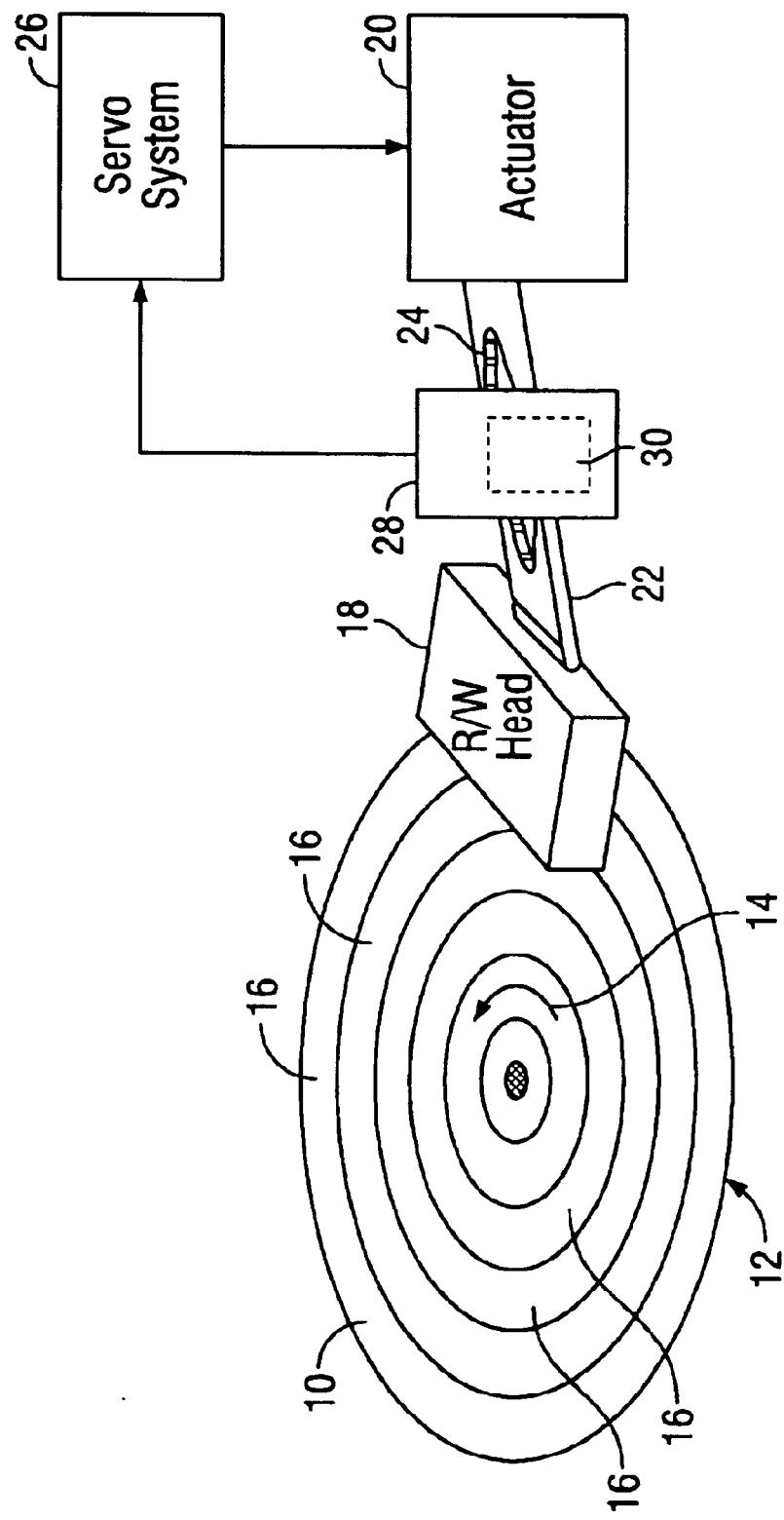
FIG. 1 is a simplified schematic diagram of a prior art LS-120 type disk drive.
Figure 2:
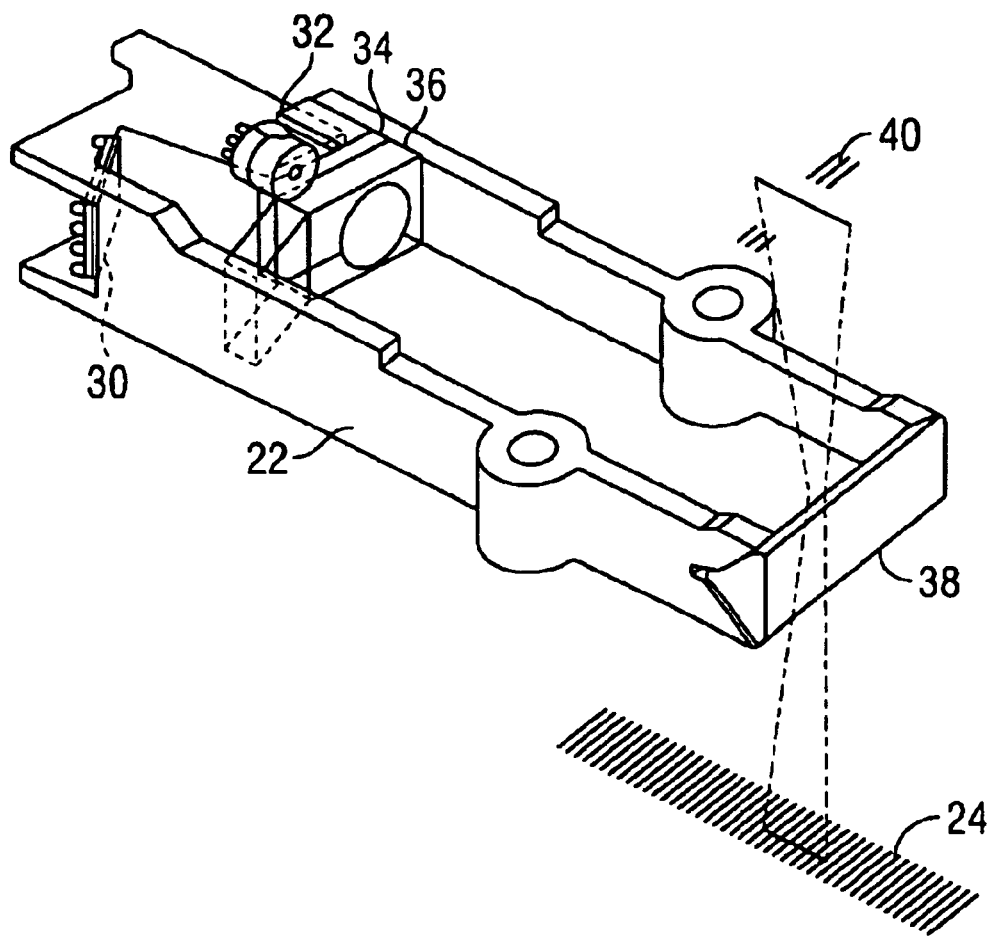
FIG. 2 is a simplified schematic diagram of a prior art optical pickup system for an LS-120 type disk drive.
Figure 3:
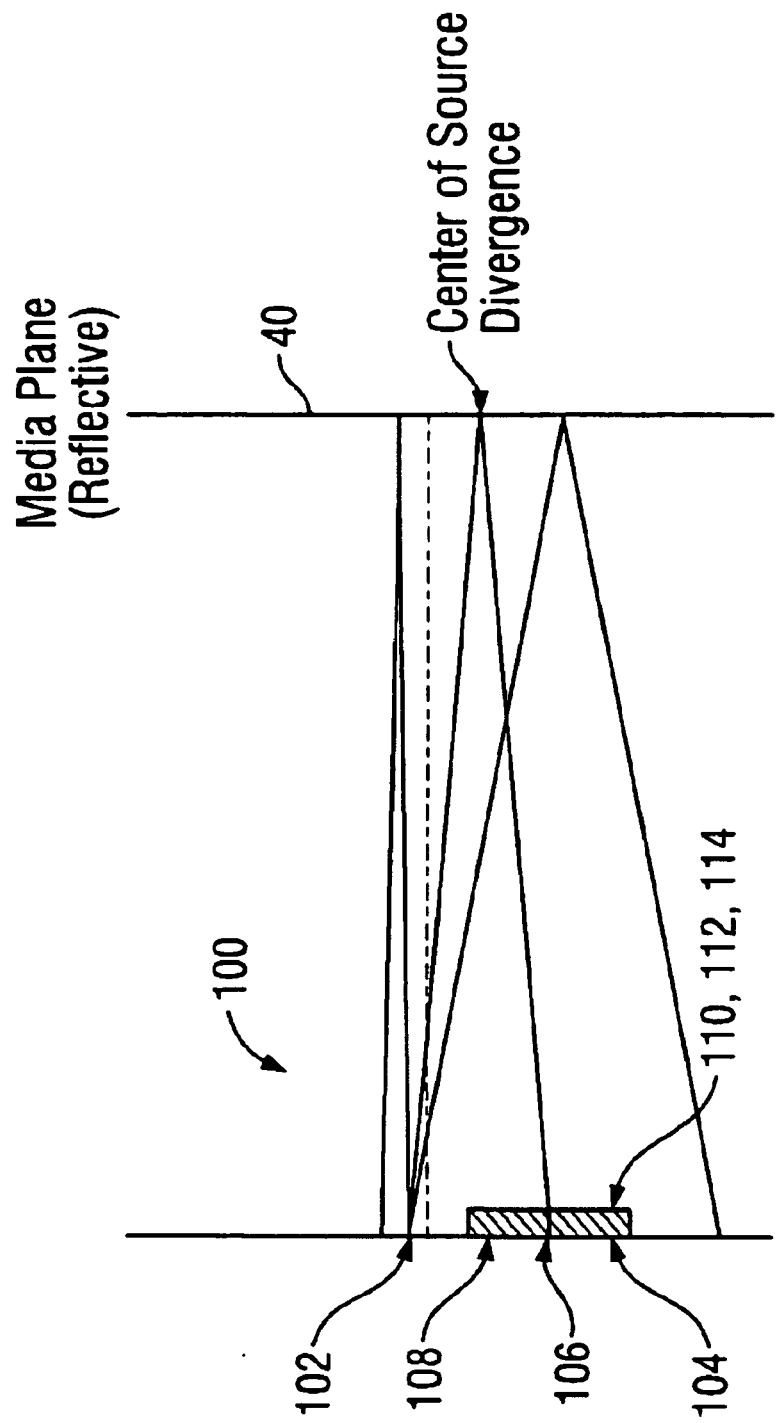
FIG. 3 is a simplified schematic diagram illustrating the principles of the invention.

Turning now to FIG. 3, a lensless optical servo system 100 has an unfocused, unmasked, undiffracted light source 102 and three patterned photodetectors 104, 106, 108. The unfocused, unmasked, undiffracted light is reflected by the markings on an LS-120 disk 40 and the reflected light carries the pattern of the markings the considerable distance in its far-field to the photodetectors 104, 106, 108. The convolution of this light pattern and a mating geometric pattern 110, 112, 114 on the photodetectors causes the photodetectors to generate signals representing the position of the track on the disk.

More particularly, the pattern on each photodetector filters the reflected light so that only the radial and tangential tracking information is seen by the detectors. Preferably, the source 102 is aligned so that the reflected light is substantially uniformly distributed about the center detector 106.

Figure 4:
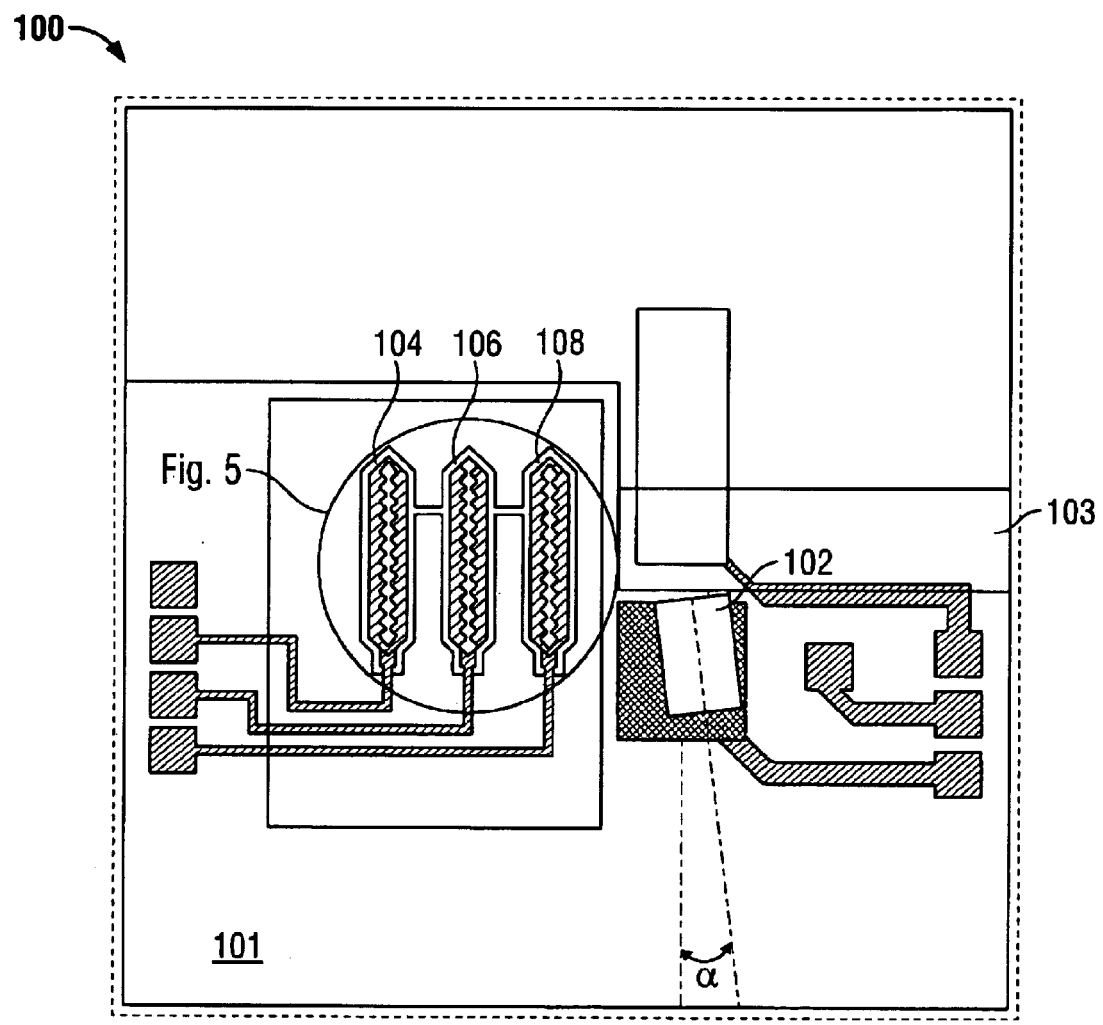
FIG. 4 is a simplified schematic diagram of a presently preferred embodiment of the invention.
Figure 5:
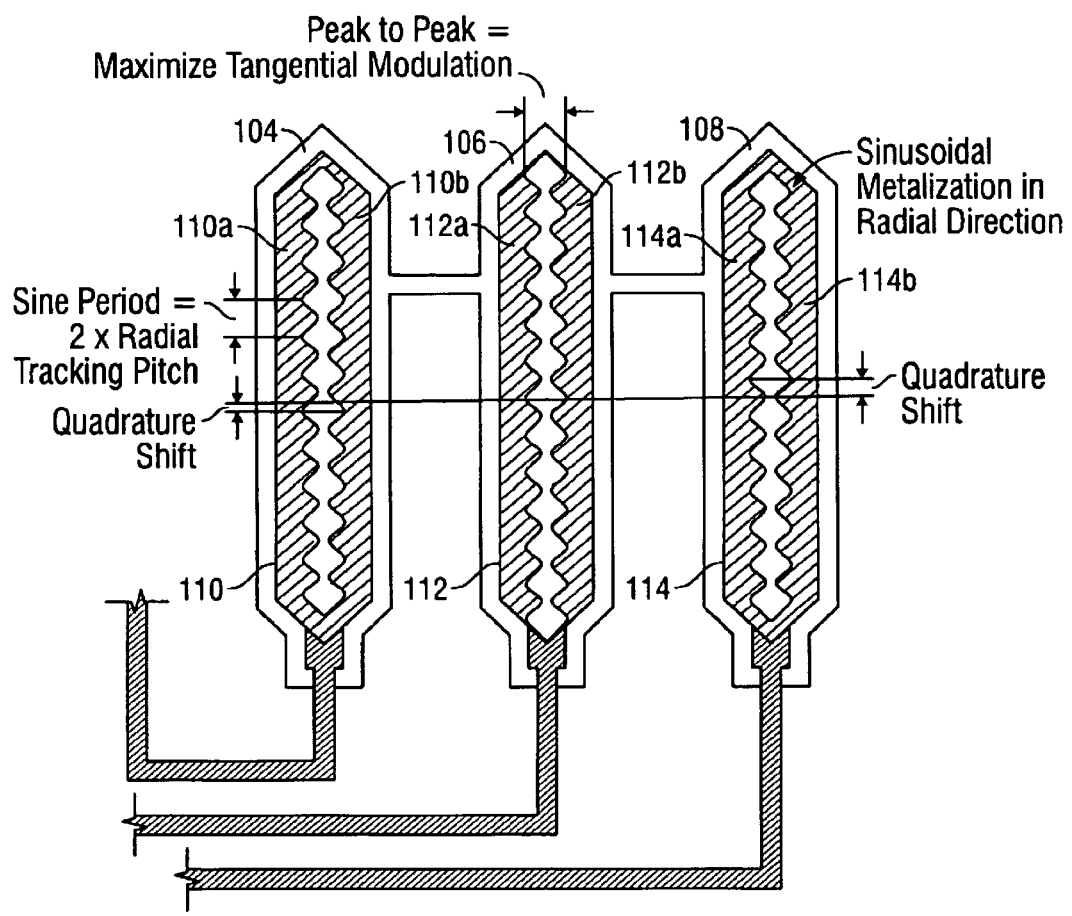
FIG. 5 is an enlarged detail of a portion of FIG. 4.

Turning now to FIGS. 4 and 5, according to a presently preferred embodiment, a laser diode 102 and three 104, 106, 108 detectors are formed on the same silicon substrate 101. The laser diode 102 is angled toward the detectors by an angle alpha and a fold mirror 103 mounted adjacent to the output of the laser diode 102 deflects the beam from the diode toward an LS-120 disk (not shown). As seen best in FIG. 5, sinusoidal metalization 110, 112, 114 is applied to the detectors 104, 106, 108 in the radial direction (radial relative to the LS-120 disk).

The period of the sinusoidal metalizations is, according to a preferred embodiment of the invention, approximately two times the tracking pitch of the disk. The sinusoidal metalization 110 on the first detector 104 is offset radially approximately ninety degrees behind the sinusoidal metalization 112 on the second detector 106; and the sinusoidal metalization 114 on the third detector 108 is offset radially approximately ninety degrees ahead of the sinusoidal metalization 112 on the second detector 106.

Preferably, each detector 104, 106, 108 is provided with two sinusoidal patterns 110a, 110b, 112a, 112b, 114a, 114b. Pattern 110a is approximately one hundred eighty degrees out of phase with, and spaced apart in the tangential direction (tangential relative to the LS-120 disk) from pattern 110b. Similarly, pattern 112a is approximately one hundred eighty degrees out of phase with, and spaced apart in the tangential direction from pattern 112b; and pattern 114a is approximately one hundred eighty degrees out of phase with, and spaced apart in the tangential direction from pattern 114b. The patterns are preferably applied lithographically.

The signals filtered by the patterns are subtracted to remove the DC component of the tracking signal. This allows for a differential detection system to occur before the tangential modulation of the tracking signal is removed. Thus, the first stage of a pre-amplifier is more effective by amplifying the tangential and radial tracking signals only and not the DC component, thereby allowing for a larger gain and more signal to noise ratio.

The lensless optical servo system of the invention is smaller and less expensive than the prior art systems, yet it meets or exceeds the servo signal requirements of an LS-120 disk drive. The lensless optical servo system of the invention does not require the costly alignment step optical systems require when assembling an LS-120 disk drive.

There have been described and illustrated herein embodiments of a lensless optical servo system. While particular embodiments of the invention have been described, it is not intended that the invention be limited thereto, as it is intended that the invention be as broad in scope as the art will allow and that the specification be read likewise.

Thus, while a particular number of detectors have been disclosed, it will be appreciated that other numbers (at least two) could be utilized. Further, while the invention is described in the context of a preferred embodiment where the phase shift from detector to detector is approximately ninety degrees, this is not intended to be a characteristic that limits the scope of the invention. For example, those skilled in the art will appreciate that an approximately (plus or minus) one hundred twenty degree phase shift between detectors would be suitable for practicing the invention. In this scenario, if three detectors were used, the one hundred twenty degree patterns used on the first and third detectors would be offset from each other by one hundred twenty degrees.

It should also be recognized that although the invention has been described with reference to and for use with an LS-120 disk drive, it may be used in other types of optical and magnetic drives. Moreover, it may be used in other positioning devices. It will therefore be appreciated by those skilled in the art that yet other modifications could be made to the provided invention without deviating from its spirit and scope as so claimed.

What is claimed is:

1. A lensless optical servo system (100) comprising:
   an unfocused, undiffracted light source (102) to generate light directed onto a rotating disk;
   a plurality of geometric pattern filters to filter light reflected from the rotating disk, each of the geometric pattern filters specifying a corresponding periodic spatial pattern to filter the reflected light, at least two of the geometric pattern filters specifying respective periodic spatial patterns that are out of phase relative to each other; and
   a plurality of photodetectors (104, 106, 108) to detect the light reflected from the disk and filtered by the geometric pattern filters, each photodetector being covered by a respective geometric pattern filter in the plurality of geometric pattern filters (110, 112, 114).

2. A lensless optical servo system (100) according to claim 1 wherein said geometric pattern filters (110, 112, 114) include a sinusoidal pattern filter to filter the reflected light.

3. A lensless optical servo system (100) according to claim 1 wherein said geometric pattern filters (110, 112, 114) include a metalized sinusoidal pattern filter to filter the reflected light.

4. A lensless optical servo system (100) according to claim 1 wherein said geometric pattern filters (110, 112, 114) include an absorbing sinusoidal pattern filter to filter the reflected light.

5. A lensless optical servo system (100) comprising:
   an unfocused, undiffracted light source to generate light directed onto a rotating disk;
   a plurality of geometric pattern filters to filter light reflected from the rotating disk; and
   a plurality of photodetectors to detect the light reflected from the disk and filtered by the geometric pattern filters, each photodetector being covered by a respective geometric pattern filter in the plurality of geometric pattern filters, wherein said plurality of photodetectors (104, 106, 108) includes a first photodetector (104) and a second photodetector (106), said first photodetector (104) is covered by a first sinusoidal pattern filter (110) and said second photodetector (106) is covered by a second sinusoidal pattern filter (112), and said first sinusoidal pattern filter (110) and said second sinusoidal pattern filter (112) are offset from each other by approximately ninety degrees.

6. A lensless optical servo system (100) comprising:
   an unfocused, undiffracted light source to generate light directed onto a rotating disk;
   a plurality of geometric pattern filters to filter light reflected from the rotating disk; and
   a plurality of photodetectors to detect the light reflected from the disk and filtered by the geometric pattern filters, each photodetector being covered by a respective geometric pattern filter in the plurality of geometric pattern filters, wherein said plurality of photodetectors (104, 106, 108) includes a first photodetector (104) and a second photodetector (106), said first photodetector (104) is covered by a first sinusoidal pattern filter (110) and said second photodetector (106) is covered by a second sinusoidal pattern filter (112), and said first sinusoidal pattern filter (110) and said second sinusoidal pattern filter (112) are offset from each other by approximately one hundred twenty degrees.

7. A lensless optical servo system (100) according to claim 5 wherein said first sinusoidal pattern filter (110) has a first part (110a) and a second part (110b), said first part (110a) of said first sinusoidal pattern filter (110) is spaced apart from and approximately one hundred eighty degrees out of phase with said second part (110b) of said first sinusoidal pattern filter (110), said second sinusoidal pattern filter (112) has a first part (112a) and a second part (112b), and said first part (112a) of said second sinusoidal pattern filter (112) is spaced apart from and approximately one hundred eighty degrees out of phase with said second part (112b) of said second sinusoidal pattern filter (112).

8. A lensless optical servo system (100) according to claim 5 wherein said plurality of photodetectors (104, 106, 108) includes third photodetector (108), said third photodetector (108) is covered by a third sinusoidal pattern filter (114), and said third sinusoidal pattern filter (114) and said second sinusoidal pattern filter (112) are offset from each other by approximately ninety degrees.

9. A lensless optical servo system (100) according to claim 8 wherein said first sinusoidal pattern filter (110) and said third sinusoidal pattern filter (114) are offset from each other by approximately one hundred eighty degrees.

10. A lensless optical servo system (100) according to claim 8 wherein said first sinusoidal pattern filter (110) has a first part (110a) and a second part (110b), said first part (110a) of said first sinusoidal pattern filter (110) is spaced apart from and approximately one hundred eighty degrees out of phase with said second part (110b) of said first sinusoidal pattern filter (110), said second sinusoidal pattern filter (112) has a first part (112a) and a second part (112b), said first part (112a) of said second sinusoidal pattern filter (112) is spaced apart from and approximately one hundred eighty degrees out of phase with said second part (112b) of said second sinusoidal pattern filter (112), said third sinusoidal pattern filter (114) has a first part (114a) and a second part (114b), said first part (114a) of said third sinusoidal pattern filter (112) is spaced apart from and approximately one hundred eighty degrees out of phase with said second part (112b) of said third sinusoidal pattern filter (112).

11. A lensless optical servo system (100) according to claim 10 wherein said first sinusoidal pattern filter (110) and said third sinusoidal pattern filter (114) are offset from each other by approximately one hundred eighty degrees.

12. A lensless optical servo system (100) according to claim 11 wherein said light source (102), said photodetectors (104, 106, 108), and said pattern filters (110, 112, 114) are all formed on a single common substrate.

13. A lensless optical servo system (100) according to claim 12 further comprising means for deflecting light (103) from said laser source (102) to the rotating disc (40).

14. A lensless optical servo system (100) according to claim 13 wherein said light source is a laser diode.

15. A lensless optical servo system (100) according to claim 1, wherein at least one of the periodic spatial patterns specified by the geometric pattern filters has a period that is related by an integer number to a tracking pitch of the disk.

16. A lensless optical servo system according to claim 15, wherein at least one of the periodic spatial patterns specified by the geometric pattern filters has a period that is approximately two times the tracking pitch of the disk.

17. A disk drive system, comprising:
   a rotating disk having a reflective pattern;
   an unfocused, undiffracted light source to generate light directed onto the rotating disk;
   a plurality of geometric pattern filters to filter light reflected from the rotating disk, each of the geometric pattern filters specifying a corresponding spatial pattern to filter the reflected light based on the reflective pattern on the disk, at least two of the geometric pattern filters specifying respective spatial patterns that are out of phase relative to each other; and
   a plurality of photodetectors to detect the light reflected from the disk and filtered by the geometric pattern filters, each photodetector being covered by a respective geometric pattern filter in the plurality of geometric pattern filters.

18. A disk drive system according to claim 17, wherein each of the spatial patterns specified by the geometric pattern filters includes a periodic spatial pattern having a period that is approximately two times the tracking pitch of the disk.

19. A lensless optical servo system configured for a disk drive including a rotating disk having a reflective pattern, the system comprising:
   an unfocused, undiffracted light source to generate light directed onto a rotating disk;
   a plurality of geometric pattern filters to filter light reflected from the rotating disk, each of the geometric pattern filters specifying a corresponding spatial pattern to filter the reflected light based on the reflective pattern on the disk, at least two of the geometric pattern filters specifying respective spatial patterns that are out of phase relative to each other; and
   a plurality of photodetectors to detect the light reflected from the disk and filtered by the geometric pattern filters, each photodetector being covered by a respective geometric pattern filter in the plurality of geometric pattern filters.

20. A lensless optical servo system according to claim 19, wherein each of the spatial patterns specified by the geometric pattern filters includes a periodic spatial pattern having a period that is approximately two times the tracking pitch of the disk.

* * * * *